US010387972B2

(12) United States Patent
O'Sullivan et al.

(10) Patent No.: US 10,387,972 B2
(45) Date of Patent: Aug. 20, 2019

(54) IMPACT ASSESSMENT FOR SHARED MEDIA SUBMISSION

(71) Applicant: International Business Machines Corporation, Armonk, NY (US)

(72) Inventors: Patrick J. O'Sullivan, Dublin (IE); Jeffrey B. Sloyer, Cary, NC (US); Edith H. Stern, Yorktown Heights, NY (US); Barry E. Willner, Briarcliff Manor, NY (US)

(73) Assignee: International Business Machines Corporation, Armonk, NY (US)

( * ) Notice: Subject to any disclaimer, the term of this patent is extended or adjusted under 35 U.S.C. 154(b) by 510 days.

(21) Appl. No.: 14/176,213

(22) Filed: Feb. 10, 2014

(65) Prior Publication Data

US 2015/0229531 A1 Aug. 13, 2015

(51) Int. Cl.
*G06F 15/173* (2006.01)
*G06Q 50/00* (2012.01)

(52) U.S. Cl.
CPC .................................... *G06Q 50/01* (2013.01)

(58) Field of Classification Search
None
See application file for complete search history.

(56) References Cited

U.S. PATENT DOCUMENTS 7,032,026 B1 * 4/2006 Biswas ............... H04L 63/0876 709/201
7,363,243 B2 4/2008 Arnett et al.
7,523,138 B2 4/2009 Gruhl et al.
2007/0266144 A1 11/2007 Bollen et al.
2010/0070485 A1 3/2010 Parsons et al.
2011/0161270 A1 6/2011 Arnett et al.
2011/0167115 A1 7/2011 Gilbert et al.
2011/0197146 A1 * 8/2011 Goto ..................... G06F 3/0482 715/753
2012/0266191 A1 * 10/2012 Abrahamsson .... G06Q 30/0224 725/35
2013/0018823 A1 1/2013 Masood
2013/0339457 A1 * 12/2013 Freire .................... G06Q 50/01 709/206

(Continued)

OTHER PUBLICATIONS

IBM; "Method and System for Preventing Cyberbullying"; An IP.com Prior Art Database Technical Disclosure; IPCOM000190517D; Dec. 3, 2009.

*Primary Examiner* — Umar Cheema
*Assistant Examiner* — Gregory P Tolchinsky
(74) *Attorney, Agent, or Firm* — Daniel R. Simek

(57) ABSTRACT

A processor receives a submission to post to a social media platform, wherein the submission includes content. The processor analyzes the content of the submission. The processor determines an impact of the content of the submission. The processor determines one or more objectives of an impact assessment, wherein each of the one or more objectives is associated with a potential impact. The processor compares the impact of the submission to the one or more objectives, based on the content of the submission which is analyzed. The processor determines an impact assessment, wherein the impact assessment is based on whether the impact meets the one or more objectives, and the processor performs an action based on the impact assessment.

19 Claims, 4 Drawing Sheets

(56) References Cited

U.S. PATENT DOCUMENTS

| | | | | |
|---|---|---|---|---|
| 2014/0280570 | A1* | 9/2014 | Sutton | G06Q 50/01 709/204 |
| 2015/0113664 | A1* | 4/2015 | Aad | G06K 9/00288 726/27 |

* cited by examiner

IMPACT ASSESSMENT FOR SHARED MEDIA SUBMISSION

FIELD OF THE INVENTION

The present invention relates generally to the field of social media, and more particularly to assessing an impact of a submission to a social media site.

BACKGROUND OF THE INVENTION

The connectivity, availability of information, and ease of access to social media sites and services offers users enormous benefits, but can also result in publicly accessible documentation of less than flattering behavior or expression. Descriptions of how text, image, video, and even audio posts, have come to haunt individuals with at least momentary lapses in discretion, are pervasive and continuous.

Perspectives, judgment and opinions of young social media users may change from their time in high school and college, until they begin to enter the workforce or seek to take on responsibilities and roles for which evaluations and scrutiny are applied. Employers often search social media sites such as Facebook™, YouTube™ (YouTube™ video community is a trademark of Google Inc.), LinkedIn™ (LinkedIn is a trademark of LinkedIn Corporation and its affiliates in the United States and/or other countries), Twitter™, as well as other forums, blogs, galleries and chat sites, to possibly obtain additional information on prospective applicants, not readily available in resumes or interviews.

Social or benevolent organizations may screen new members by using searches of social media sites to obtain insight into membership applicants. College admissions may also view online social media sites hoping to find indications of potential behavioral or other risks, and avoid future issues by screening-out applicants based in part on publicly available social media postings.

Most social media services and sites provide privacy settings to control who is able to have access to posted materials, however many, if not most, social media users fail to take full advantage of these settings. In other cases, posting of compromising images of one person may be posted by another person with non-damaging intent, but public sharing of the image can result in damaging consequences at a later time.

Users having experienced impact of a social media posting may reconsider the posting if the potential consequences were known or implied before hand.

SUMMARY

Embodiments of the present invention disclose a method, computer program product, and system for assessing an impact of a submission to a social media platform. A processor receives a submission to post to a social media platform, wherein the submission includes content. The processor analyzes the content of the submission. The processor determines an impact of the content of the submission. The processor determines one or more objectives of an impact assessment, wherein each of the one or more objectives is associated with a potential impact. The processor compares the impact of the submission to the one or more objectives, based on the content of the submission which is analyzed. The processor determines an impact assessment, wherein the impact assessment is based on whether the impact meets the one or more objectives, and the processor performs an action based on the impact assessment.

DETAILED DESCRIPTION

Figure 1:
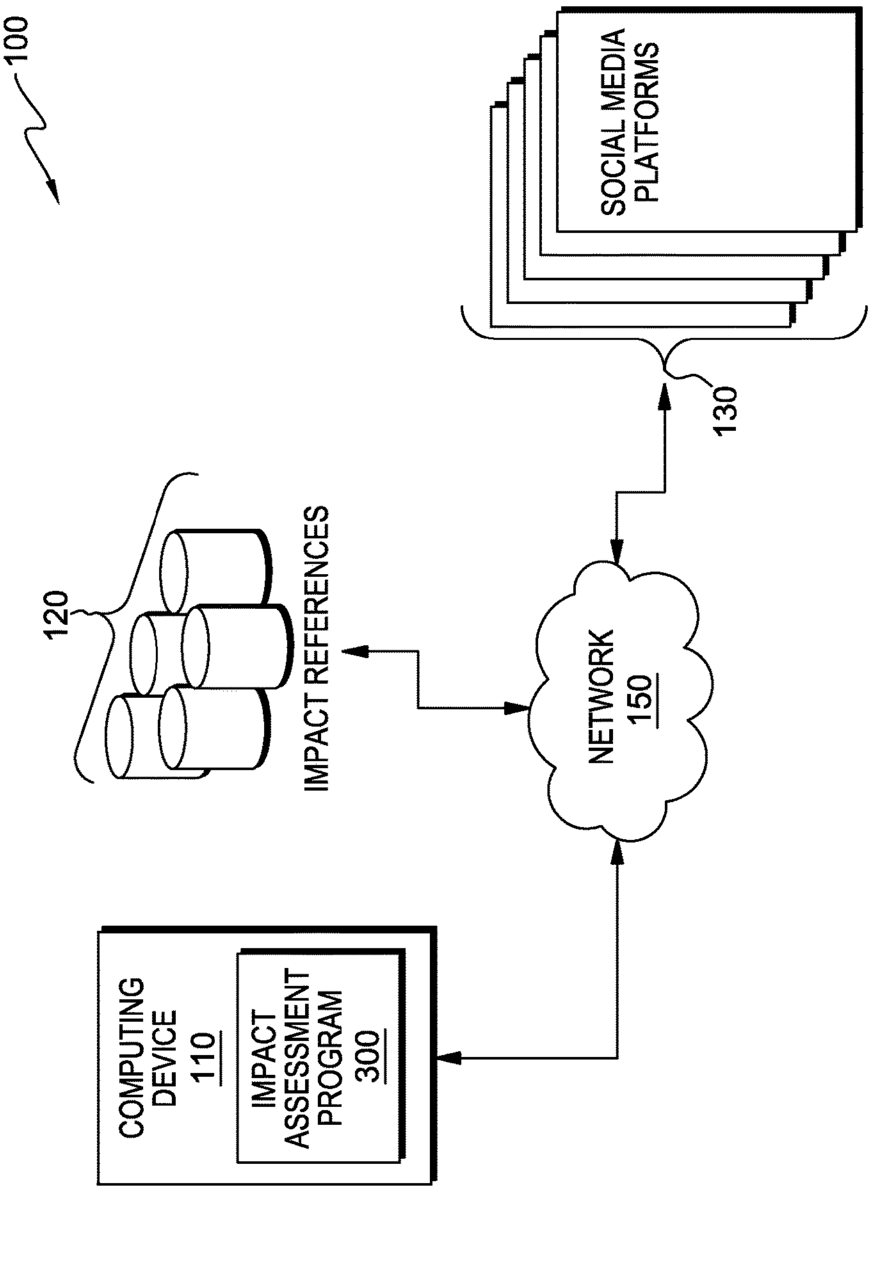
FIG. 1 is a functional block diagram illustrating a distributed social media environment, in accordance with an embodiment of the present invention.

Embodiments of the present invention recognized that users may post content to social media without full consideration of the impact the content of the posting may have and how the impact may reflect on the user, currently or in the future. Embodiments of the present invention receive the social media submission and perform an impact assessment on the content to determine a potential impact if posted. The impact is compared to one or more objectives that may be selected or pre-defined, and may be specific to the social media to which the submission is intended for posting. The one or more objectives are compared to the content which is contributing to a potential impact and an impact assessment is made, based on whether the content of the submission meets the one or more objectives, or does not violate the one or more objectives. Embodiments of the present invention take action on the submission based on the results of the impact assessment.

In one embodiment, the one or more objectives may be selected by the user for each submission. In another embodiment, the one or more objectives may be pre-set based on a policy of the particular social media platform to which the submission is targeted, or may be a service applied to any submission to social media from a communication provider. Embodiments of the present invention may be implemented on a client computer, may be included as part of a social media platform or site, may be included as part of an internet service provider's service, and may be applied to an enterprise or organizational entity providing various social media platform access to users.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a wave-guide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture, including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The present invention will now be described in detail with reference to the Figures. FIG. 1 is a functional block diagram illustrating a distributed data processing environment, generally designated 100, in accordance with one embodiment of the present invention. FIG. 1 includes computing device 110 which operates impact assessment program 300, impact references 120, social media platforms 130, and network 150.

Network 150 interconnects social media platforms 130 and impact references 120 to computing device 110. Impact assessment program 300 is depicted as residing on computing device 110; however, in another embodiment of the present invention, impact assessment program 300 is accessible to computing device 110 via network 150. Network 150 can be, for example, a local area network (LAN), a wide area network (WAN), such as the Internet, or a combination of the two, and can include wired or wireless connections. Network 150 can be a communication fabric within or between computer processors, such as a PCIe bus. In general, network 150 can be any combination of connections and protocols that will support communications via various channels between computing device 110, impact references 120 and social media platforms 130, within distributed database environment 100, in accordance with an embodiment of the present invention.

Social media platforms 130 is a plurality of distributed web-based sites or services that accept electronic formatted content to be received as a submission. Social media platforms 130 may be, for example, one or a combination of a blog, a forum, a photo gallery, a chat room, a comment section, an email service, or a short message service (SMS). Social media platforms 130 receives content from a user, referred to as a submission, and may display the submission for reading, viewing or listening, depending upon the format of the submission.

Submission content may include text, images, video, and/or audio, depending on the format of the content. Submissions created on a user's computing device, such as computing device 110, which include text, can be posted to a viewable area within social media platforms 130 and may be viewable by other users accessing the social media platform, or by a select group given permission to view the text content. Similarly, submissions that include images, video, or audio may be accessible to audiences with permission and access to the submission content.

In one embodiment of the present invention, social media platforms 130 can include publicly accessible, shared sites, such as Facebook™, YouTube™ (YouTube™ video community is a trademark of Google Inc.), LinkedIn™ (LinkedIn is a trademark of LinkedIn Corporation and its affiliates in the United States and/or other countries), or Twitter™, to name a few. Submissions to these sites can be accessed by audiences that can vary from selected members with permissions to all members, depending on a user's settings, and may allow members with access to re-post the submission, which creates multiple instances of the submission. In other embodiments, social media platforms 130 can be sites that accept electronic content as part of a user transaction, such as submitting a résumé, a cover letter, an application for acceptance, or an application for membership. In such cases the submission may not be viewable by a large audience; however, submissions of this type may also result in unexpected consequences based on the content.

Impact references 120 is a plurality of reference sources that can be used to identify content that can be interpreted in a manner that potentially results in a negative or positive impact. The term "impact" refers in the context of a submission of electronic content, to outcomes, results, consequences, or activities that occur stemming from the review of the content by one or more social media users. Impact references 120 includes a collection of known content and content elements that may produce an impact. The impact may have dependency on the audience, the social media site to which the content is submitted, the timing of the submission, or other conditions or characteristics. In one embodiment of the present invention, impact references 120 can be used by impact assessment program 300 to identify content components that may have an impact. Impact references 120 can be lookup tables of keywords or phrases known to have a positive or negative impact with respect to various audiences. In other embodiments, impact references 120 can be a large number of electronic documents or image objects, which can be used in statistical hypothesis testing, to determine if content may potentially have an impact.

Computing device 110 includes capability for a user of computing device 110 to create, copy, or obtain content and submit the content to a social media site to have the content available for viewing or sharing. Computing device 110 may be a laptop computer, tablet computer, netbook computer, personal computer (PC), a desktop computer, a personal digital assistant (PDA), a smart phone, or any programmable electronic device capable of communicating with impact references 120 and social media platforms 130 via network 150 and with various components and other devices within distributed database environment 100 (not shown). Computing device 110 includes internal and external hardware components, as depicted and described in further detail with respect to FIG. 4.

Computing device 110 is depicted as including impact assessment program 300. In one embodiment of the present invention, impact assessment program 300 resides and operates on computing device 110. In other embodiments impact assessment program 300 is accessed via network 150 and operated by computing device 110. In still other embodiments, impact assessment program 300 may be operated by a computing device different from the device on which a submission is sent by a user to a social media platform.

Impact assessment program 300 performs an impact assessment on the content submitted by a user of computing device 110, to warn or confirm that the content of the submission to social media sites 130 may produce an impact that meets an objective associated with the submission. Impact assessment program 300 determines an impact assessment by comparing content elements determined to potentially pose an impact, to one or more objectives that includes criteria associated with impacts to be avoided or promoted, depending on the one or more objectives.

Impact assessment program 300 can perform impact assessments on submissions to social media platforms that include text, images, video, and/or audio. Impact assessment program 300 determines the format of the submission content and uses an appropriate analysis engine to analyze the submission content and uses impact references, such as impact references 120, to identify the content elements that may potentially pose an impact. Impact assessment program 300 determines if the submission content potentially poses an impact that meets the objective (or multiple objectives) that applies to the submission, and finding that the impact meets the objective, impact assessment program 300 can take actions to mitigate the impact.

Figure 2A:
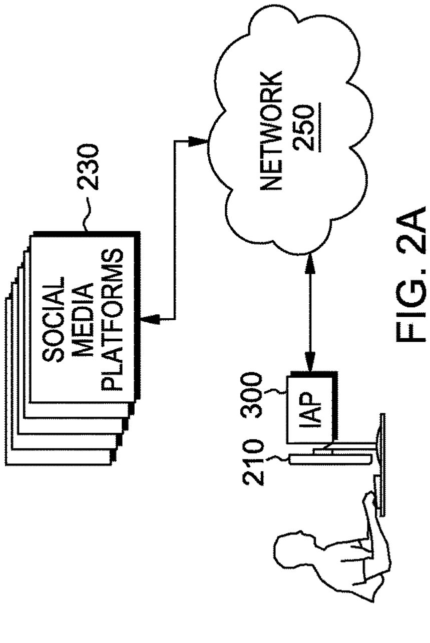
FIG. 2A illustrates an impact assessment program (IAP), operating on a client device within the distributed social media environment of FIG. 1, in accordance with an embodiment of the present invention.

FIG. 2A is a functional block diagram depicting an exemplary impact assessment performed on a client computing device, in accordance with an embodiment of the present invention. FIG. 2A includes computing device 210, impact assessment program (IAP) 300, network 250 and social media platforms 230. In an exemplary embodiment of the present invention, a user of computing device 210 creates or selects a submission that is intended to be posted on at least one of social media platforms 230. Computing device 210 is configured to create or select content for the submission that may include text, image, video, or audio format, or a combination of formats.

Impact assessment program 300 is shown to be associated with computing device 210 and intercepts the submission before it is posted to social media platforms 230. In this case impact assessment program 300 may be an application running on computing device 210, or may be incorporated within a browser on computing device 210. Impact assessment program 300 determines an objective that includes criteria associated with the impact of the content of the submission. In this exemplary case the user of computing device 210 is presented with a list of objective criteria to select. The user may select one or more objectives, and may select criteria for each objective, or the criteria may be automatically selected by making a selection of an objective. The objective chosen by the user may be intended to avoid offending certain audience members of the social media to which the submission is targeted. Alternatively, the objective chosen by the user may intend to avoid current or future embarrassment to the user, or may intend to promote a positive image of the user by the audience of the social media to which the submission is targeted.

Network 250 interconnects social media platforms 230 to computing device 210. Network 150 can be, for example, a local area network (LAN), a wide area network (WAN), such as the Internet, or a combination of the two, and can include wired or wireless connections. In general, network 250 can be any combination of connections and protocols that will support communications via various channels between computing device 210 and social media platforms 230, in accordance with an embodiment of the present invention.

Social media platforms 230 can be web sites supporting blogs, forums, discussions, comment sections, chats, image galleries, and/or video/audio galleries. In other embodiments of the present invention, social media platforms 230 can be online submission of applications, for example, submitting a resume for a job application, or applying to a college or university. In yet other embodiments, social media platforms 230 may include email services or short message service (SMS) texting. Social media platforms 230 is characterized by having an audience or membership that can view submissions of text, image, video, or listen to audio, submitted or "posted" by users. In some cases, once posted, the submissions are not retrievable or removable by the submitting user, and may remain accessible to audiences indefinitely.

Impact assessment program 300 analyzes the content of the submission, using resources, such as impact references 120, which are based on the format of the content, and determines if the content includes a potential impact. Impact assessment program 300 compares the potential impact to the criteria of the one or more objectives selected, to determine if the potential impact meets the intent of the one or more objectives or not. If the one or more objectives are not met by the potential impact that has been determined, impact assessment program 300 takes an action, which may include notifying the user of the impact relative to the one or more objectives, and offering options.

Figure 2B:
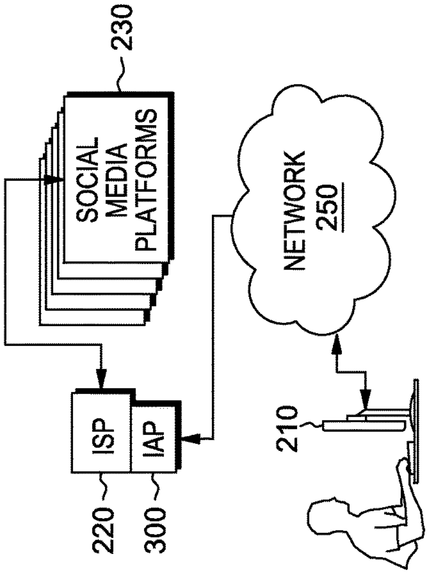
FIG. 2B illustrates an impact assessment program operating in conjunction with an Internet service provider (ISP), within the distributed social media environment of FIG. 1, in accordance with an embodiment of the present invention.

FIG. 2B illustrates an impact assessment program operating in conjunction with an Internet service provider (ISP), within the distributed social media environment of FIG. 1, in accordance with an embodiment of the present invention. In this case the user of computing device 210 forwards a submission that is targeted for social media platforms 230 via network 250. Internet service provider (ISP) 220 includes impact assessment program 300, for example, as a service, and intercepts submissions forwarded by a user of computing device 210. In one embodiment of the present invention, impact assessment program 300 may offer the user of computing device 210 who has authored the submission, to select one or more objectives against which the content of the submission will be analyzed and compared, to determine an impact assessment. In another embodiment, one or more objectives may be pre-set by ISP 220 based on the types and levels of impacts that controlling entities of ISP 220 intend to avoid. ISP 220 may pre-set one or more objectives that affect all users of ISP 220 or may pre-set one or more objectives based on a particular user's profile information, a user's submission history, or based on recent or current events.

Figure 2C:
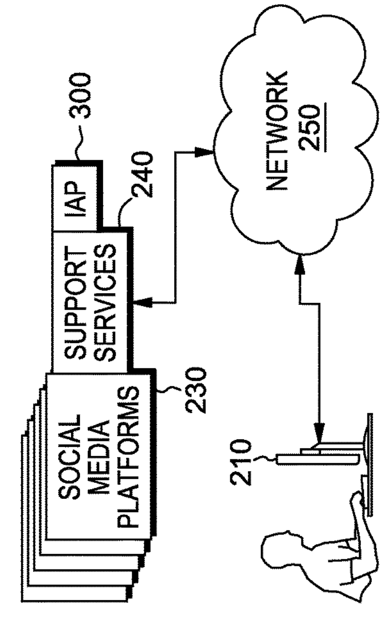
FIG. 2C illustrates an impact assessment program operating in conjunction with support services of social media platforms, within the distributed social media environment of FIG. 1, in accordance with an embodiment of the present invention.

FIG. 2C illustrates an impact assessment program operating in conjunction with support services of social media platforms, within the distributed social media environment of FIG. 1, in accordance with an embodiment of the present invention. FIG. 2C includes computing device 210, network 250, social media platforms 230, support services 240, and impact assessment program 300. In an exemplary embodiment, a user of computing device 210 creates or selects a submission intended for posting on social media platforms 230. The submission is forwarded from computing device 210 via network 250 and is received by support services 240.

Support services 240 is a computing device with access to programs and resources to provide supporting services to social media platforms 230, and having access to impact assessment program 300. Support services 240 intercepts the submission from computing device 210 and impact assessment program 300 determines one or more objectives to be applied to the submission to determine an impact assessment. Impact assessment program 300 analyzes the content of the submission and determines an impact and compares the impact to the one or more objectives to produce an impact assessment. If the impact assessment does not meet the one or more objectives, impact assessment program 300 takes action to mitigate or avoid the impact.

Support services 240 may determine the one or more objectives to be applied to submissions to social media 230. Having impact assessment program 300 associated with social media platforms 230 enables filtering of submissions prior to posting and may avoid posting of content containing sensitive subjects or potentially offensive submission content. For example, social media platforms 230 may be a forum for teen topics. Support services 240 may determine an objective to be applied to submissions to the forum, which includes preventing bullying submissions posted to the forum, as this can protect social media platforms 230 from obtaining a poor image of allowing inappropriate forum behavior and not protecting users.

Impact assessment program 300 analyzes text submissions for terms and phrases potentially or known to be associated with bullying behavior, and if found, impact assessment program 300 may block the submission and associate the author with the submission.

Figure 2D:
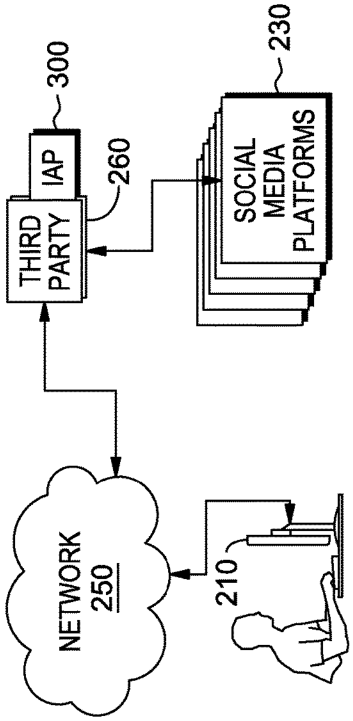
FIG. 2D illustrates an impact assessment program operating in conjunction with a third party communication provider, within the distributed social media environment of FIG. 1, in accordance with an embodiment of the present invention.

FIG. 2D illustrates an impact assessment program operating in conjunction with a third party communication provider, within the distributed social media environment of FIG. 1, in accordance with an embodiment of the present invention. FIG. 2D includes computing device 210, network 250, social media platforms 230, third party 260, and impact assessment program 300. In an exemplary embodiment, a user of computing device 210 creates or selects a submission intended for posting on social media platforms 230. The submission is forwarded from computing device 210 via network 250 and is received by third party 260, which has access to impact assessment program 300.

Third party 260 is a computing device of an entity not directly associated with social media platforms 230, but may provide or enable communications channels by which computing device 210 is able to forward submissions that include content to social media platforms 230. Third party 260 intercepts the submission from network 250 that originated from computing device 210. Impact assessment program 300 determines one or more objectives to be applied to the submission to determine an impact assessment. Impact assessment program 300 analyzes the content of the submission and determines a potential impact and compares the potential impact to the one or more objectives to produce an impact assessment. If the impact assessment does not meet the one or more objectives, impact assessment program 300 takes action to mitigate or avoid the impact.

Third party 260 may determine the one or more objectives to be applied to submissions to social media 230, enabling filtering of submissions prior to posting and may avoid posting of submission content that third party 260 determines to be a sensitive subject to which third party 260 does not want to be associated, or third party 260 may consider some or all of the submission content to be inappropriate or unacceptable.

For example, social media platforms 230 may be an employer-provided email service. Third party 260 may be an employer that produces and/or markets services or products and desires to maintain a neutral position on highly debated political subjects. Third party 260 may determine one or more objectives to be applied to submissions to the forum from employees using company-provided equipment and email services of third party 260. The objectives may intend to prevent extreme or polarizing political comments from sources that can be identified as an employee of third party 260, and produce the impression that third party 260 embraces the political views. An impact may result from employees communicating via company-provided email, and including political references not associated with a work transaction. Such comments may be interpreted as third party 260 embracing the political views. Applying the one or more objectives can protect third party 260 from a negative impact on current or potential customer relations.

Impact assessment program 300 analyzes text submissions for terms and phrases associated with the products, services or third party 260 and negatively associated content, and if found, impact assessment program 300 may block the submission and may even identify the author of the submission.

Figure 3:
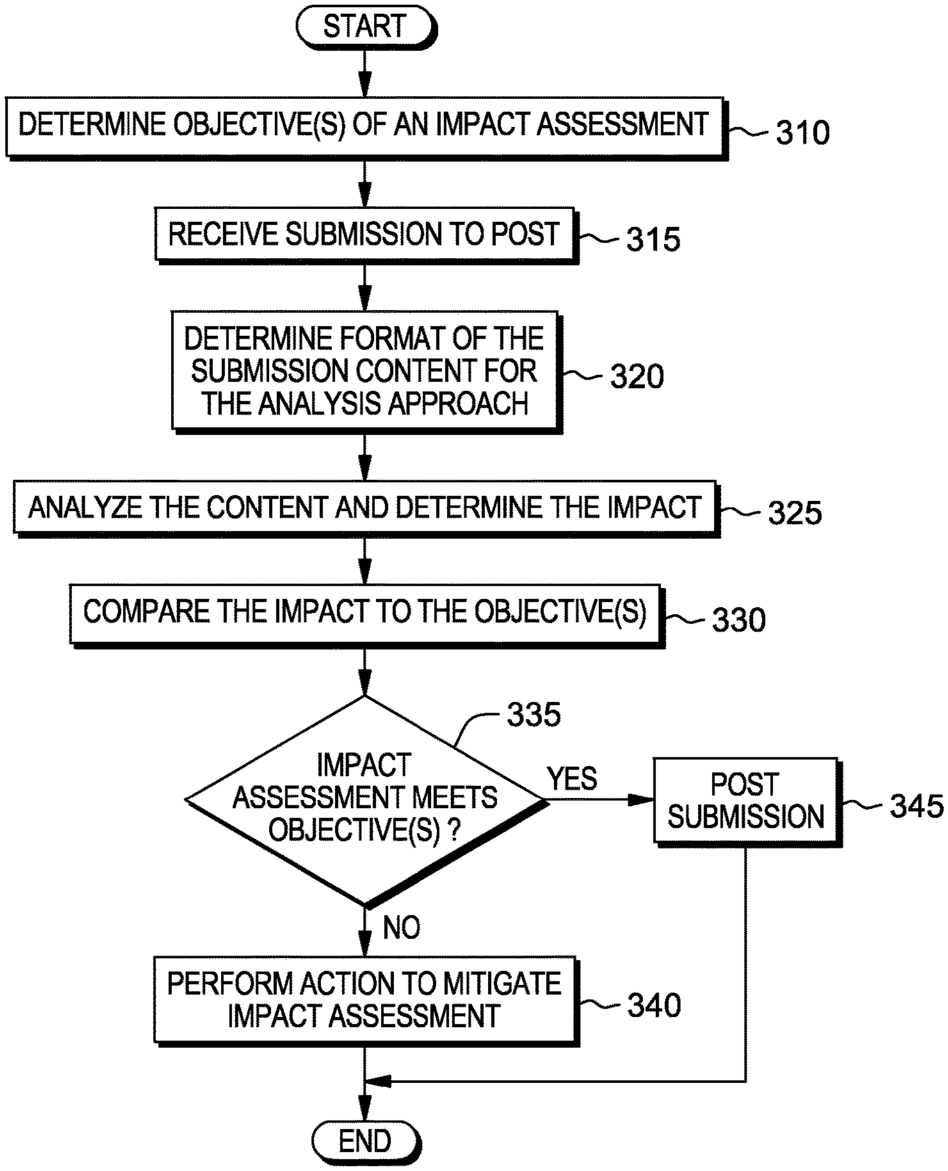
FIG. 3 is a flowchart depicting operational steps of an impact assessment program within the distributed social media environment of FIG. 1, in accordance with an embodiment of the present invention.

FIG. 3 is a flowchart depicting the operational steps of impact assessment program 300, in accordance with an embodiment of the present invention. Impact assessment program 300 determines one or more objectives of an impact assessment (step 310). An objective of an impact assessment includes criteria to be avoided or promoted, depending upon the intent of the objective, regarding the content of the submission. The criteria of the objective may include for example, a sensitive subject dealing with extreme viewpoints, religious or moral beliefs, ethnic or racial slurs, potentially offensive language, or age-inappropriate expressions. Objectives, for example, may be directed towards the known audience of a particular social media site, may focus on avoiding unfavorable associations, may attempt to avoid "flaming" of other users or bullying comments, or may be aligned with information, relationships, or memberships, included in a user profile. Objectives may be directed towards promoting a positive impact as in the case of applying for employment, admission or pursuing an elected position.

Objectives are associated with information resources that are used by impact assessment program 300 to identify content within a submission that may potentially produce an impact, and may fail to meet an objective. Examples of information resources may include, but are not limited to, lookup lists of words, phrases, expressions, and symbols; user profile information that may include relationships, memberships, place of employment, schools in attendance, and location; online libraries, articles, documents, news and current events.

Having determined one or more objectives, impact assessment program 300 receives a submission to post (step 315). Impact assessment program 300 intercepts the submission before it is sent to the intended social media platform for posting. In one embodiment of the present invention, the interception of the submission by impact assessment program 300 is known by the user, and the user may have selected one or more objectives to be applied to the analyzed content of the submission in the determination of an impact assessment. In another embodiment, impact assessment program 300 works in the background and the user may not be aware of the activity performed by impact assessment program 300.

Impact assessment program 300 determines the format of the submission content to for the analysis approach (step 320). A submission may include text, such as in a posting to a discussion forum, a blog, a comment to other postings. A text-based submission may also include a distributed short message service (SMS) text message, a trending text message, a shared document or an email. Submissions may also include an image, such as an electronic photograph or computer-generated graphic image, a video, comprised of a sequence of multiple image frames displayed per second, or audio content comprised of digital sound recordings. Impact assessment program 300 analyzes the submission and determines the format of the content, for example, determining if the content includes text, image(s), video, or audio, or in some instances, a submission may include a combination of different content formats.

Determining the format of the content of a submission, impact assessment program 300 determines the approach of analysis to be used. Embodiments of the present invention may use keyword lookup tables to identify text or combinations of text words of a text submission that may potentially result in an impact. In other embodiments, an analytic engine may be used that employs text analytics which determines patterns, structure, relevance and interpretation of input text. In yet other embodiments, the analytic engine may also include use of natural language processing (NLP) which is based on machine learning and use of statistical techniques to derive a probability of the meaning of a natural language input.

Natural language processing may be further combined with semantic analysis, which is the task of building structures that approximate concepts from a large set of documents, and/or sentiment analysis, which is the identification and extraction of subjective information in source materials. Semantic analysis may include techniques that determine parts of speech and relate syntactic structure of phrases and sentences of the input content, to their meanings. In some cases analysis that identifies a spectrum of emotions, referred to as emotional analytics, may be used to determine emotional content and context within content of a submission. Additionally, computing techniques may be used to effectively assess the user context in association with the proposed input content to enrich the impact assessment.

In other embodiments, the analytical engine may determine confidence factors for one or more hypothesis in which at least some portion of the content of a submission may potentially produce an impact. The confidence factors are probabilities determined from analysis of the content compared with potentially or known content with similar or related contextual information. For multiple hypotheses, the hypothesis associated with the highest confidence factor is determined to be the potential impact. In some embodiments, there may be a threshold for the confidence factors that must be met or exceeded to be considered a potential impact.

In the case of a submission including audio input, an analytic engine may include speech recognition techniques to determine the content of the digitized audio submission and further analyze the determined content with techniques used for text, to determine potential content impact. Audio input may be received in formats such as, WAV, WMA, MP3, Au, AIFF, and ALAC, for example.

An analytic engine for image analysis may include the extraction of information from images using digital image processing techniques, which can include, but are not limited to, facial recognition, object recognition, pattern recognition, digital geometry, and digital signal processing. For example, a user's profile may include a digital image of the user's face and may also include images of others to which the user has a relationship. Impact assessment program 300, working in conjunction with an analysis engine using facial recognition techniques may determine that a digital photograph submitted to be posted includes the user and another person whose face is identified by available profile information. Text may be extracted from an image (e.g., the text written on a sign within the image), and analysis performed on the textual data. Image input may be received in formats such as graphics interchange format (GIF), joint photographic experts group (JPEG), bitmap (BMP), or portable network graphics (PNG), for example. Video content may be analyzed using image analysis techniques for each video frame as well as motion detection techniques. Video analysis includes determining a codec, which is an abbreviation for "coder/decoder" and is a way of encoding video into a stream of bytes, and containers which describes the structure of the video file and is identified typically by a file extension such as .AVI, .MP4, or .MOV, for example.

Using the content format information, impact assessment program 300 analyzes the content and determines the impact (step 325). Determining the impact refers to identifying the elements of the content that may reflect negative (or overly positive) connotations that potentially may produce an impact. The elements of the content can be potentially or known to be similar-to offensive content, indicate inappropriateness, or imply unintended support or rejection of subjects, opinions, or views. Determining an impact may involve the use of complex NLP techniques, semantic analysis, or a hypothesis setting and testing type of analysis such as IBM Watson™ (IBM and IBM Watson are trademarks of International Business Machines Corporation, registered in many jurisdictions worldwide), or other simpler techniques, such as looking up words or combinations of words in tables.

In one embodiment of the present invention, the resulting analysis of the submission content is referenced against resources that include potential impact producing content. Resources may include keyword lists, potential or known lists of expressions or phrases that are known to have an impact on some or most audiences, or known to be associated with certain behavior, such as the bullying or flaming of another user. The resources are accessible to impact assessment program 300 either directly, stored on the same computing device, or via network 150. For example, the content of a submission intercepted by impact assessment program 300 is analyzed and the words and phrases in the submission are referenced against resources accessible to impact assessment program 300. Words and phrases from the submission are found by impact assessment program 300 to be included in a list of words and phrases that are known to be (or potentially to be) sensitive to an audience, and thus are considered to be a potential impact. For example, the list of words and phrases may include politically sensitive words and phrases.

Having determined an impact, impact assessment program 300 compares the impact to the one or more objectives (step 330). The criteria included in one or more objectives are compared to the analyzed content of the submission that has been determined to potentially be an impact. The comparison determines the presence or absence of potential impact content that is in common with criteria of the one or more objectives. For the content of the submission to meet the one or more objectives, the potential impact as determined from the analyzed submission content must be absent or be below a determined threshold level, from the subject area(s) and specific references of the objective(s) and objective criteria. A threshold level, for example, may be a frequency count of words or phrases, or be based on a total value as determined from the sum of weighted values associated with specific words or phrases, such that being below such threshold level renders the submission as likely to have no negative impact if posted/transmitted/communicated publicly.

In one embodiment of the present invention, meeting the objective(s) may include, for example, analysis of the submission content that results in no potential impact, in which case, regardless of the objective, the objective is met. In another embodiment, analysis of the submission content may result in a potential impact to a first group of people. If the objective(s) that have been selected or pre-set do not include any reference associated with the first group, then the objectives have been met by the submission. For example, the analysis of the submission content may result in a potential impact associated with a particular point of view of a political topic. If the user submitting the content holds a different point of view of the topic, and the selected objectives do not reference criticism of the topic's alternative point of view, then the analysis of the content does not conflict with the selected objectives, and the objectives are met.

The result of comparing the content determined to potentially result in an impact, to the criteria of the one or more objectives is the impact assessment, which determines if the objective(s) have been met. Impact assessment program 300 determines if the impact assessment meets the one or more objectives (decision step 335), and determining that the impact assessment does not meet the one or more objectives (step 335, "NO" branch), impact assessment program 300 performs an action to mitigate the impact assessment (step 340). To avoid the potential impact of the submission, impact assessment program 300 performs one or more actions that can include, but is not limited to, one or more of: presenting an awareness notification or indicator to the user, recommending or requiring an edit of the submission, sending the submission to an approver, implementing a waiting period before having the user re-confirm sending the submission, totally blocking the as-is submission from being sent to its intended destination.

For example, having determined that the submission content includes the potential impact of offending a particular group "A" of people, and the objectives include avoidance of offending people in group "A", impact assessment program may display a notification to the user submitting the content and advice the user of that content of the submission includes a potential impact and continuing the submission will violate one or more of the objectives that have been set. The user may be offered opportunity to edit the submission, discard the submission, have the submission reviewed by an approver, or possibly over-ride the notification and send the submission for posting, as long as the posting/communication of the submission is not known or believed to be offensive. In another embodiment, the objectives may be a pre-set policy by an employer providing communication access for the user. The submission that includes content that does not meet the pre-set objectives may be blocked and deleted, and the user submitting the content may not be informed that the submission was not sent. After performing an action to mitigate the impact assessment, impact assessment program 300 ends.

Determining that the impact assessment meets the one or more objectives (step 335, "YES" branch), impact assessment program 300 allows the post of the submission (step 345). Impact assessment program 300 allows the submission that meets the one or more objectives to be sent to the intended destination, and impact assessment program 300 ends.

In embodiments of the present invention, by performing an impact assessment on the submission content, impact assessment program 300 offers awareness and/or protection against a user inadvertently sharing content publicly that violates one or more objectives, or a communications provider or other third party that intends to avoid inappropriate comments, opinions, positions or implied associations to which the provider or third party wishes to remain dissociated or neutral.

In cases such as a submission to a potential employer or to admission, such as to a college or university, the user authoring the submission may choose an objective that promotes a positive impact, such as personal characteristics, attitudes, skills, participating activities, and goals. The absence of content that is analyzed to potentially provide a positive impact, when a positive objective is in place, would similarly result in impact assessment program 300 performing an action to mitigate the failure of the submission content to meet the objective. One skilled in the art will realize that considerable value is provided by impact assessments determined to be less than 100% effective, and as analysis techniques and algorithm training improves, the value also improves.

Figure 4:
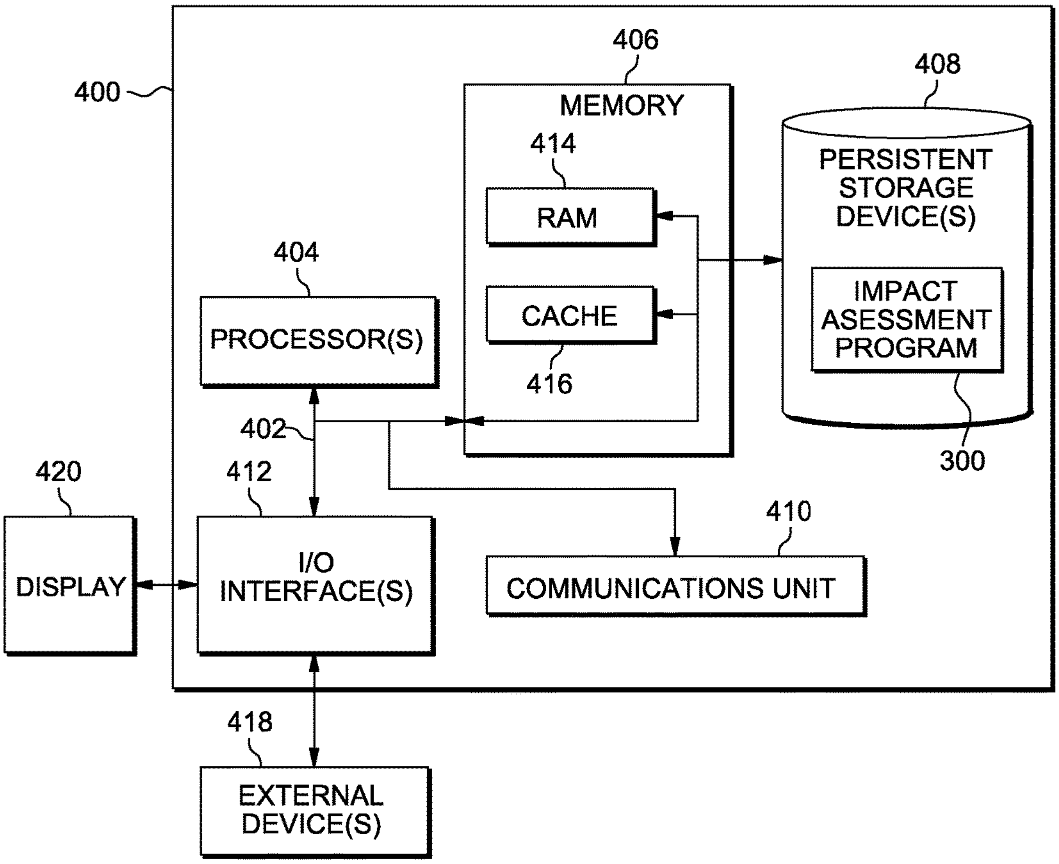
FIG. 4 depicts a block diagram of components of a computing device capable of performing the operations of an impact assessment program, in accordance with an embodiment of the present invention

FIG. 4 depicts a block diagram of components of computing device 400, capable of performing the operations of impact assessment program 300, in accordance with an illustrative embodiment of the present invention. It should be appreciated that FIG. 4 provides only an illustration of one implementation and does not imply any limitations with regard to the environments in which different embodiments may be implemented. Many modifications to the depicted environment may be made.

Computing device 400 includes communications fabric 402, which provides communications between computer processor(s) 404, memory 406, persistent storage device(s) 408, communications unit 410, and input/output (I/O) interface(s) 412. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses.

Memory 406 and persistent storage device(s) 408 are computer readable storage media. In this embodiment, memory 406 includes random access memory (RAM) 414 and cache memory 416. In general, memory 406 can include any suitable volatile or non-volatile computer readable storage media.

Impact assessment program 300 is stored in persistent storage device(s) 408 for execution by one or more of the respective computer processors 404 via one or more memories of memory 406. In this embodiment, persistent storage device(s) 408 includes a magnetic hard disk drive. Alternatively, or in addition to a magnetic hard disk drive, persistent storage device(s) 408 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage device(s) 408 may also be removable. For example, a removable hard drive may be used for persistent storage device(s) 408. Other examples include optical and magnetic disks, thumb drives, and smart cards that are inserted into a drive for transfer onto another computer readable storage medium that is also part of persistent storage device(s) 408.

Communications unit 410, in these examples, provides for communications with other data processing systems or devices, including resources of distributed data processing environment 100 and computing device 110. In these examples, communications unit 410 includes one or more network interface cards. Communications unit 410 may provide communications through the use of either or both physical and wireless communications links. Impact assessment program 300 may be downloaded to persistent storage device(s) 408 through communications unit 410.

I/O interface(s) 412 allows for input and output of data with other devices that may be connected to computing device 400. For example, I/O interface 412 may provide a connection to external devices 418 such as a keyboard, keypad, a touch screen, and/or some other suitable input device. External devices 418 can also include portable computer readable storage media such as, for example, thumb drives, portable optical or magnetic disks, and memory cards. Software and data used to practice embodiments of the present invention, e.g., impact assessment program 300, can be stored on such portable computer readable storage media and can be loaded onto persistent storage device(s) 408 via I/O interface(s) 412. I/O interface(s) 412 also connect to a display 420.

Display 420 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for assessing an impact of a submission to an online social media platform, the method comprising:

determining, by a processor, one or more objectives of an impact assessment, wherein the one or more objectives include criteria directed toward social media communication with an audience having access to online content that is posted on an online social media platform;

intercepting, by the processor, a submission of online content authored on a user's device prior to transmission of the submission of online content from the user's device;

performing, by the processor, semantic analysis, sentiment analysis, and emotional analysis on the submission of the online content;

generating, by the processor, a purport, a sentiment, and an emotional context of the submission of the online content, based on the semantic analysis, sentiment analysis and emotional analysis performed;

comparing, by the processor, the purport of the submission of the online content to the one or more objectives that include the criteria, wherein the criteria are associated with a sensitivity of the audience to the online content of the submission, resulting in an impact;

generating, by the processor, a confidence factor of whether the purport of the online content of the submission violates the criteria of the one or more objectives of the impact assessment by a statistical probability of the purport aligning with known content violations;

in response to the confidence factor of the purport of the online content violating the criteria of the one or more objectives of the impact assessment, exceeding a predetermined threshold, the processor generating the first impact assessment indicating a violation of the one or more objectives; and in response to the generation of a first impact assessment, performing, by the processor, a mitigating action, wherein the mitigating action includes presenting a notification on the user's device regarding an anticipated impact on the audience, and determining a receipt of confirmation of an edit, indicated as required by the first impact assessment, performed on the online content, and wherein the required edit removes the violation of the one or more objectives prior to transmission of the online content to the social media platform, as confirmed by a second impact assessment.

2. The method of claim 1, wherein the one or more objectives are determined by a pre-set policy of a third party, the pre-set policy being set by other than an author of the submission and the third party being other than the author of the submission.

3. The method of claim 1, wherein the one or more objectives are selected, based on a social media site to which the submission is targeted.

4. The method of claim 1, wherein determining a sensitivity of the content of the submission to the criteria of the one or more objectives, further comprises:

determining, by the processor, the impact, based on a confidence factor generated for each potential impact of a plurality of potential impacts, wherein the impact is the potential reaction impact of the plurality of potential impacts having the confidence factor that is highest.

5. The method of claim 1, wherein the submission to the social media platform is an electronic document submitted to an organizational entity, and wherein the one or more objectives identify sensitive subjects within the content of the submission.

6. The method of claim 1, wherein the one or more objectives includes promoting a positive impact, wherein the impact assessment determines whether the content of the submission will be interpreted as positive by an audience of the social media.

7. The method of claim 1, wherein performing an analysis of the content of the submission further comprises:

receiving, by the processor, results of an analysis of the content of the submission from an analysis service.

8. The method of claim 1, wherein analyzing the content of the submission includes use of an analytic engine which is selected based on a format of the submission, and wherein the format of the submission is determined to be one or a combination of: a short text message format, a longer text message format, an image format, a video format, an audio format.

9. The method of claim 1, wherein determining the impact of the content of the submission, further comprises:

analyzing, by the processor, the content of the submission by using one or more analytic engines which includes at least one of: sentiment analysis, semantic analysis, emotional analysis, statistical hypothesis testing, keyword matching, facial recognition, object recognition, pattern recognition, digital geometry, digital signal processing.

10. The method of claim 1, wherein performing, by the processor, the mitigating action also includes one or more actions selected from a group including: providing an indicator of the impact of the content of the submission, blocking the submission, routing the submission to an approver, recommending changes to the content of the submission, requiring a waiting period and re-sending the submission.

11. A computer program product for assessing an impact of a submission to an online social media platform, the computer program product comprising:

a computer readable storage medium having program instructions embodied therewith, the program instructions executable by a processor, the program instruction to cause the processor to perform a method comprising:

determining one or more objectives of an impact assessment, wherein the one or more objectives include criteria directed toward online social media communication with an audience having access to online content that is posted on an online social media platform;

intercepting a submission of online content authored on a user's device prior to transmission of the submission of online content from the user's device;

performing semantic analysis, sentiment analysis, and emotional analysis on the submission of the online content;

generating a purport, a sentiment, and an emotional context of the submission of the online content, based on the semantic analysis, sentiment analysis and emotional analysis performed;

comparing the purport of the submission of the online content to the one or more objectives that include the criteria, wherein the criteria are associated with a sensitivity of the audience to the online content of the submission, resulting in an impact;

generating a confidence factor of whether the purport of the online content of the submission violates the criteria of the one or more objectives of the impact assessment by a statistical probability of the purport of the submission of the online content aligning with known content violations;

in response to the confidence factor of the purport of the online content violating the criteria of the one or more objectives of the impact assessment, exceeding a pre-determined threshold, generating a first impact assessment indicating a violation of the one or more objectives; and in response to the generation of the first impact assessment, performing a mitigating action, wherein the mitigating action includes presenting a notification on the user's device regarding an anticipated impact on the audience, and determining a receipt of confirmation of an edit, indicated as required by the first impact assessment, performed on the online content, and wherein the required edit removes the violation of the one or more objectives prior to transmission of the online content to the social media platform, as confirmed by a second impact assessment.

12. The computer program product of claim 11, wherein the one or more objectives are selected, based on a social media site to which the submission is targeted.

13. The computer program product of claim 11, wherein the submission to the social media platform is an electronic document submitted to an organizational entity, and wherein the one or more objectives identify sensitive subjects within the content of the submission.

14. The computer program product of claim 11, wherein the one or more objectives includes promoting a positive impact, wherein the impact assessment determines whether the content of the submission will be interpreted as positive by an audience of the social media.

15. A computer system for assessing an impact of a submission to an online social media platform the computer system comprising:

one or more computer processors;

one or more computer readable storage media;

program instructions stored on the computer readable storage media for execution by at least one of the one or more processors, the program instructions comprising:

program instructions to determine one or more objectives of an impact assessment, wherein the one or more objectives include criteria directed toward online social media communication with an audience having access to online content that is posted on an online social media platform;

program instructions to intercept a submission of online content authored on a user's device prior to transmission of the submission of online content from the user's device;

program instructions to perform semantic analysis, sentiment analysis, and emotional analysis on the submission of the online content;

program instructions to generate a purport, a sentiment, and an emotional context of the submission of the online content, based on the semantic analysis, sentiment analysis and emotional analysis performed;

program instructions to compare the purport of the submission of the online content to the one or more objectives that include the criteria, wherein the criteria are associated with a sensitivity of the audience to the online content of the submission, resulting in an impact;

program instructions to generate a confidence factor of whether the purport of the online content of the submission violates the criteria of the one or more objectives of the impact assessment by a statistical probability of the purport of the submission of the online content aligning with known content violations;

in response to the confidence factor of the purport of the online content violating the criteria of the one or more objectives of the impact assessment, exceeding a pre-determined threshold, program instructions to generate a first impact assessment indicating a violation of the one or more objectives; and in response to the generation of the first impact assessment, program instructions to perform a mitigating action, wherein the mitigating action includes presenting a notification on the user's device regarding an anticipated impact on the audience, and determining a receipt of confirmation of an edit, indicated as required by the first impact assessment, performed on the online content, and wherein the required edit removes the violation of the one or more objectives prior to transmission of the online content to the social media platform, as confirmed by a second impact assessment.

16. The computer system of claim 15, wherein the one or more objectives are selected, based on a social media site to which the submission is targeted.

17. The computer system of claim 15, wherein the submission to the social media platform is an electronic document submitted to an organizational entity, and wherein the one or more objectives identify sensitive subjects within the content of the submission.

18. The computer system of claim 15, wherein the one or more objectives includes promoting a positive impact, wherein the impact assessment determines whether the content of the submission will be interpreted as positive by an audience of the social media.

19. The method of claim 1, wherein the mitigating action includes delaying the transmission of the submission to the social media platform to be posted, and presenting the submission to the author for confirmation to proceed with sending the submission subsequent to a pre-determined period of delay, as an alternative confirmation of an edit performed on the online content.

* * * * *